United States Patent
Liang

(10) Patent No.: US 7,353,401 B2
(45) Date of Patent: Apr. 1, 2008

(54) DEVICE AND METHOD FOR DATA PROTECTION BY SCRAMBLING ADDRESS LINES

(75) Inventor: Bor-Sung Liang, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 638 days.

(21) Appl. No.: 10/878,324

(22) Filed: Jun. 29, 2004

(65) Prior Publication Data

US 2005/0010789 A1 Jan. 13, 2005

(30) Foreign Application Priority Data

Jul. 9, 2003 (TW) .............................. 92118768 A

(51) Int. Cl.
*G06F 12/14* (2006.01)
(52) U.S. Cl. ....................................... 713/190; 713/189
(58) Field of Classification Search ................. 713/189, 713/190
See application file for complete search history.

(56) References Cited

U.S. PATENT DOCUMENTS

| | | | | |
|---|---|---|---|---|
| 4,120,030 A | * | 10/1978 | Johnstone | 713/190 |
| 4,278,837 A | * | 7/1981 | Best | 713/190 |
| 4,465,901 A | * | 8/1984 | Best | 713/190 |
| 5,081,675 A | * | 1/1992 | Kittirutsunetorn | 713/190 |
| 5,943,283 A | * | 8/1999 | Wong et al. | 365/230.01 |
| 6,061,449 A | * | 5/2000 | Candelore et al. | 380/28 |
| 6,122,716 A | * | 9/2000 | Combs | 711/163 |
| 6,125,182 A | * | 9/2000 | Satterfield | 380/28 |
| 6,219,746 B1 | * | 4/2001 | Vogley | 711/104 |
| 6,338,139 B1 | * | 1/2002 | Ando et al. | 713/168 |
| 6,473,861 B1 | * | 10/2002 | Stokes | 713/193 |
| 6,594,747 B2 | * | 7/2003 | Takayasu | 711/163 |
| 6,792,528 B1 | * | 9/2004 | Hou | 380/57 |
| 6,967,896 B2 | * | 11/2005 | Eisen et al. | 365/238.5 |
| 7,003,622 B2 | * | 2/2006 | Shinohara et al. | 711/104 |
| 2002/0016894 A1 | * | 2/2002 | Takayasu | 711/163 |
| 2003/0028710 A1 | * | 2/2003 | Shinohara et al. | 711/104 |
| 2003/0028747 A1 | * | 2/2003 | Denneau et al. | 711/206 |
| 2003/0093685 A1 | * | 5/2003 | Tobin | 713/200 |

* cited by examiner

*Primary Examiner*—Nasser Moazzami
*Assistant Examiner*—David Garcia Cervetti
(74) *Attorney, Agent, or Firm*—Bacon & Thomas, PLLC

(57) ABSTRACT

A device and method for data protection by scrambling address lines is disclosed, which includes a redundancy area-setting unit, a redundancy area-mapping rule unit, an area check unit, an address-mapping unit and a multiplexer. The area check unit compares an address of address bus with addresses of first data area or redundancy area stored in the redundancy area-setting unit and accordingly generates a comparison result. The address-mapping unit converts the address of address bus into an address of redundancy area. The multiplexer outputs the address of redundancy area when the comparison result and a switch control signal are logic true; otherwise the address of address bus is output.

19 Claims, 4 Drawing Sheets

DEVICE AND METHOD FOR DATA PROTECTION BY SCRAMBLING ADDRESS LINES

BACKGROUND OF THE INVENTION

1. Field of the Invention

The present invention relates to the technical field of processors and, more particularly, to a device and method for data protection by scrambling address lines in a processor.

2. Description of Related Art

Due to the importance of intellectual properties, manufactories usually scramble their intellectual property (IP), including data and programs, off-line for data protection and store the scrambled data in a non-volatile memory or storage medium, such that an unauthorized person cannot access the data even if he/she obtains the memory or storage medium with the scrambled data.

U.S. Pat. No. 6,408,073 granted to Hsu, et al. for an "Scramble circuit to protect data in a read only memory" discloses a scramble circuit for protecting data stored in a read only memory by applying both a pseudo-random generator and an initial value seed1/seed2 to code ROM (Read Only Memory) data and thus generates encoded data. However, since the scrambling technology uses random numbers as parameters, such a data protection method requires a synchronous random generator for decoding. Thus program codes cannot be executed directly on such a ROM protected by this method, because any branch or jump in a program may dynamically change the decoding sequence. For example, FIG. 1 shows an exemplary set of program codes that are encrypted by sequential random numbers and stored in a ROM from $1F00\_0000_H$ to $1F00\_0020_H$. When a processor executes the program codes directly, a conditional branch may lead to a problem. That is, after the processor executes the third instruction (i.e., instr #3 of FIG. 1) representing bz $1F00\_0020_H$ at address $1F00\_000C_H$, it may jump to address $1F00\_0020_H$ for next execution in accordance with the content of zero flag. However, on one hand, data stored in address $1F00\_0020_H$ results in encoding with a number '78' generated by applying a pseudo random generator 20 to instr #8 of FIG. 1, and on the other hand, the processor decodes data stored in address $1F00\_0020_H$ using value 60 generated by the pseudo random generator at this moment, instead of the value '78' in the encoding process. Accordingly, the program is not executed properly due to the cited error, even the processor may stall. Therefore, applying a random generator or pseudo random generator can protect ROM data only, not for RAN (Random Access Memory), Flash and the like.

To solve the problem, U.S. Pat. No. 5,943,283 granted to Wong, et al. for an "Address scrambling in a semiconductor memory" uses address scrambling to convert sequential input addresses into non-sequential physical addresses, thus achieving data protection for RAM or Flash. However, if the stored data has significant sequencing pattern (e.g., Boot-up Strap procedure for a processor, or common function tables), data protection used can easily be cracked by guessing data disposition.

Therefore, it is desirable to provide an improved data protection method to mitigate and/or obviate the aforementioned problems.

SUMMARY OF THE INVENTION

The object of the present invention is to provide a device for data protection by scrambling address lines in a processor core, thereby avoiding the prior scrambling crack from data arrangement guess and achieving data protection.

In accordance with one aspect of the present invention, there is provided a device for data protection by scrambling address lines in a processor core. The processor core executes instructions of the processor and accesses data through an address bus and a data bus. The data is stored in a first data area for important information and a second data area. The device for data protection includes a redundancy area-setting unit, a redundancy area-mapping rule unit, an area check unit, an address-mapping unit and a multiplexer. The redundancy area-setting unit sets addresses of the first data area and addresses of a redundancy area corresponding to the first data area. The redundancy area-mapping rule unit provides rule for converting addresses of the first data area into addresses of the redundancy area. The area check unit is connected to the redundancy area-setting unit and the address bus, for comparing an address on the address bus with addresses of the redundancy area stored in the redundancy area-setting unit and generating a comparison result. The address-mapping unit is connected to the redundancy area-mapping rule unit and the address bus, for converting the address on the address bus into an address of the redundancy area. The multiplexer is controlled by the comparison result and a switch control signal in order to output the address of the redundancy area when the comparison result and the switch control signal are logic true or otherwise output the address of the address bus.

In accordance with another aspect of the present invention, there is provided a method for data protection by scrambling address lines in a processor core. The processor core executes instructions of the processor and accesses data through an address bus and a data bus. The data is stored in a first data area for important information and a second data area. The method for data protection includes steps: (A) copying content of the first data area to a redundancy area; (B) recording both addresses of the first data area and the redundancy area; (C) providing rule for converting addresses of the first data area into addresses of the redundancy area; (D) comparing an address on the address bus with addresses of the first data area or the redundancy area and generating a comparison result when the processor core is to access data; (E) converting the address on the address bus into an address of the redundancy area in accordance with the rule; (F) selecting an output address in accordance with the comparison result and a switch control signal, wherein the address of the redundancy area is output when the comparison result and the switch control signal are logic true, and otherwise the address of the address bus is output.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
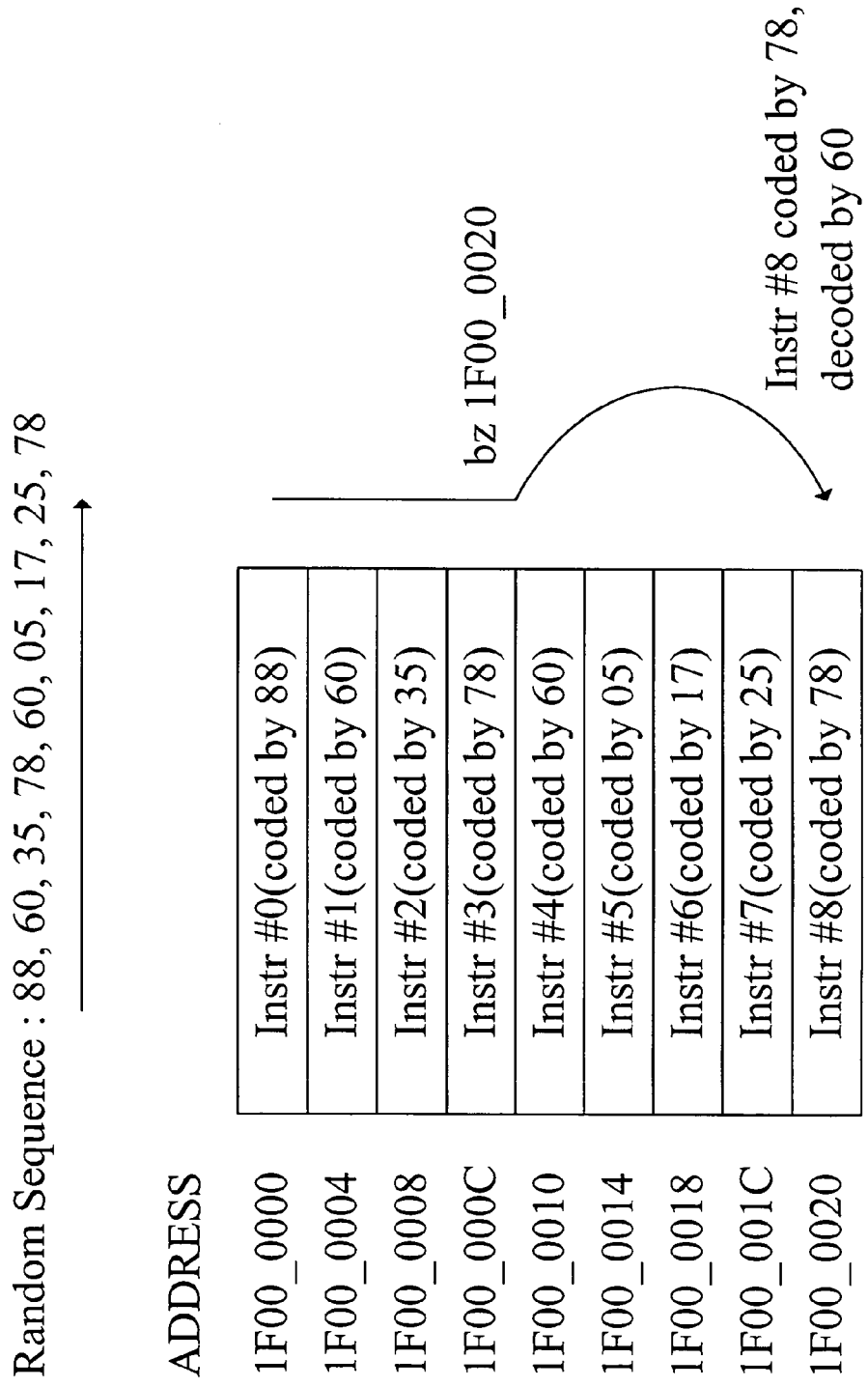
FIG. 1 is a schematic flow of encoding a program based on an initial value by a prior pseudo random generator.
Figure 2:
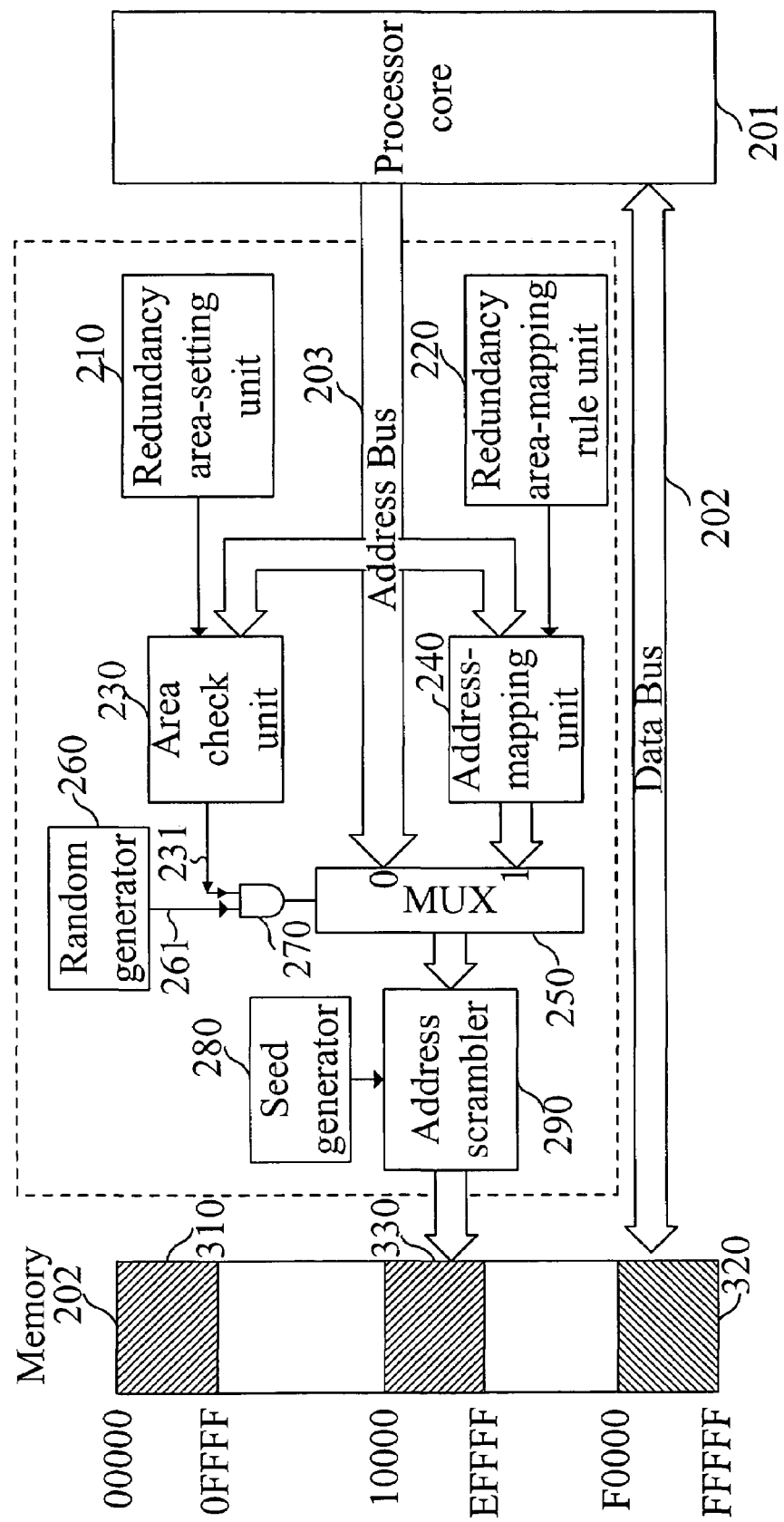
FIG. 2 is a block diagram of a device for data protection by scrambling address lines in a processor core in accordance with the invention.

FIG. 2 is a block diagram of a device for data protection by scrambling address lines in a processor core 201 in accordance with the invention. In FIG. 2, the processor core 201 executes instructions of the processor and accesses data through an address bus 203 and a data bus 202. The accessed data is stored in a memory 202 on a first data area 310 for important information and a second data area 330.

The device for data protection by scrambling address lines in a processor core includes a redundancy area-setting unit 210, a redundancy area-mapping rule unit 220, an area check unit 230, an address-mapping unit 240, a multiplexer 250, a random generator 260, an AND gate 270, a seed generator 280 and an address scrambler 290.

The redundancy area-setting unit 210 sets address of the first data area 310 and addresses of a redundancy area 320 corresponding to the first data area 310. For example, the content of the first data area 310 on addresses $00000_H$~$0FFFF_H$ is copied to the redundancy area 320 on addresses $F0000_H$~$FFFFF_H$ while the second data area 330 is on addresses $10000_H$~$EFFFF_H$. In this case, address $0xxxx_H$ (in the first data area 310) or $Fxxxx_H$ (in the redundancy area 320) are set for address detection in the redundancy area-setting unit 210, where 'x' means 'don't care'.

The area check unit 230 is connected to the redundancy area-setting unit 210 and the address bus 203, for comparing the address stored in the redundancy area-setting unit 210 with an address on the address bus 203 and generating a comparison result 231. If the processor core 201 is to read the content at an address $0ABCD_H$, the area check unit 230 finds that the address $0ABCD_H$ to be read is matched to address in the redundancy area-setting unit 210 (i.e., address $0xxxx_H$ of the first data area 310) and accordingly outputs the comparison result 231 as logic true (1). On the other hand, if the processor core 201 is to read the content at an address $23456_H$, the area check unit 230 finds that the address $23456_H$ to be read is not matched to address in the redundancy area-setting unit 210 (i.e., addresses $0xxxx_H$ of the first data area 310) and accordingly outputs the comparison result 231 as logic false (0).

The redundancy area-mapping rule unit 220 provides rule for converting addresses of the first data area 310 into addresses of the redundancy area 320. For example, the address conversion is set as inverting of address lines from bit 19 to bit 16 such that addresses of the first data area 310 is converted into addresses of the redundancy area 320.

The address-mapping unit 240 is connected to the redundancy area-mapping rule unit 220 and the address bus 203, for converting the address of the first data area 310 on the address bus 203 into an address of the redundancy area 320. For example, when the processor core 201 is to read data on address $0ABCD_H$, the address-mapping unit 240 converts it into an address $FABCD_H$.

The multiplexer 250 is connected to the address bus 203 of the processor core 201 and the output address lines of the address-mapping unit 240, and controlled by the comparison result 231 and a switch control signal 261, which can determine to output the address of the address bus 203 of the processor core 201 or output address of the address-mapping unit 240.

When the processor core 201 is to read data at address $0ABCD_H$, the comparison result of the area check unit 230 is logic true. When the switch control signal 261 is also logic true, the AND gate 270 outputs logic true (1) and thus the multiplexer 250 outputs address $FABCD_H$ of the address-mapping unit 240. As such, the processor core 201 accesses data from the address $FABCD_H$. On the other hand, when the switch control signal 261 is logic false (0), the AND gate 270 outputs logic false (0) even though the comparison result is logic true. Thus, the multiplexer 250 outputs address $0ABCD_H$ on the address bus 203 of the processor core 201.

When the processor core 201 is to read data at address $23456_H$, the comparison result of the area check unit 230 is logic false (0) and thus the AND gate 270 outputs logic false (0). Therefore, the multiplexer 250 outputs address $23456_H$ on the address bus 203 of the processor core 201, which is located in the second data area 330.

The aforementioned switch control signal 261 can be generated by the random generator 260 or the processor core 201, thereby increasing uncertainty of accessing the first data area 310 and the redundancy area 320.

The seed generator 280 randomly generates a seed. The address scrambler 290 is connected to an output of the multiplexer for performing address scrambling on output address of the multiplexer based on the seed. The address scrambler 290 can generate a scrambled address in accordance with entire or partial addresses.

The address scrambler 290 can generate a scrambled address in accordance with (a-r) address lines on the address bus, where a is the number of entire address lines and $2^r$ is word number of a cache line in a cache memory of the processor.

Because physical address lines of a memory are much fewer than address lines used by the processor, address line number q on the address bus is greater than or equal to address line number p after the scrambling performance.

Figure 3:
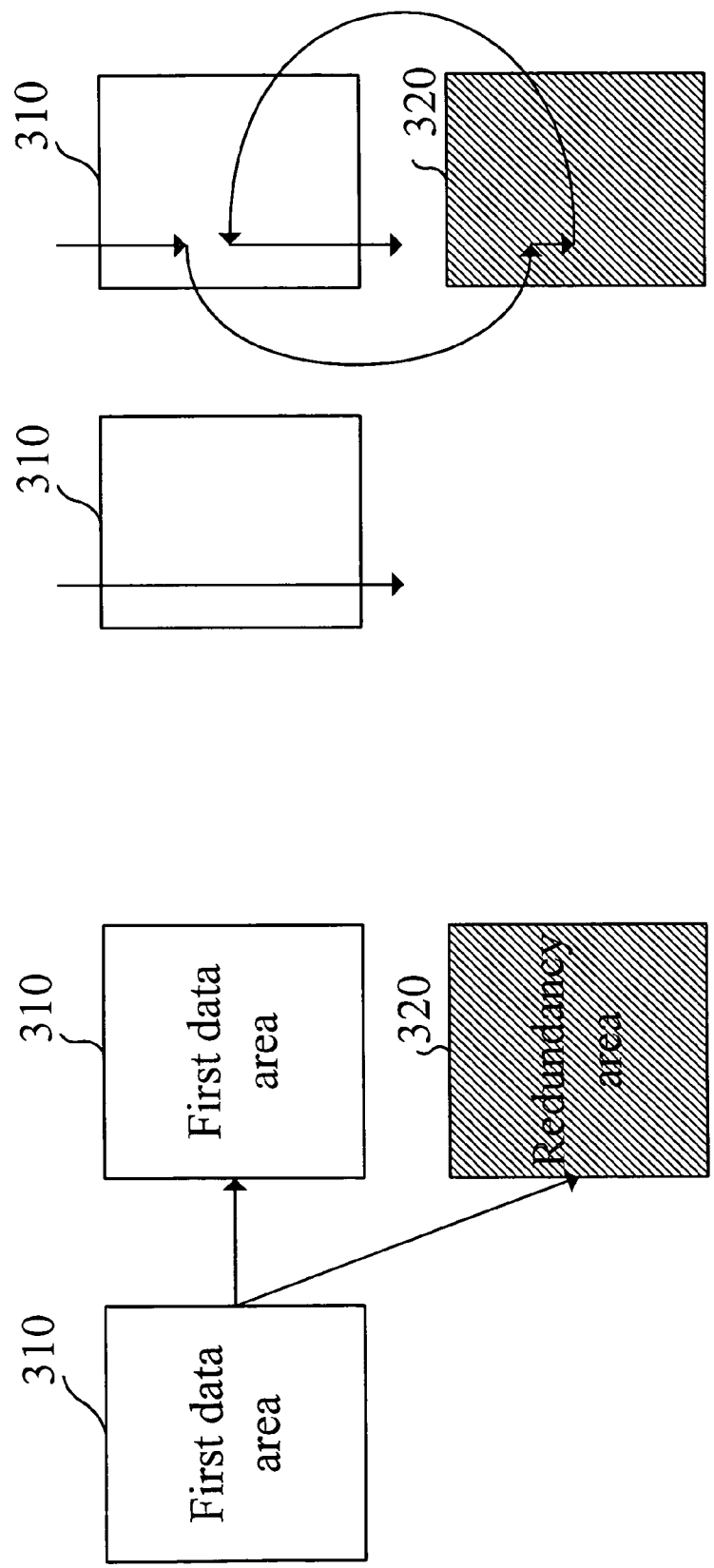
FIG. 3 is a schematic flow of reading data from first data area and redundancy area in accordance with the invention.
Figure 4:
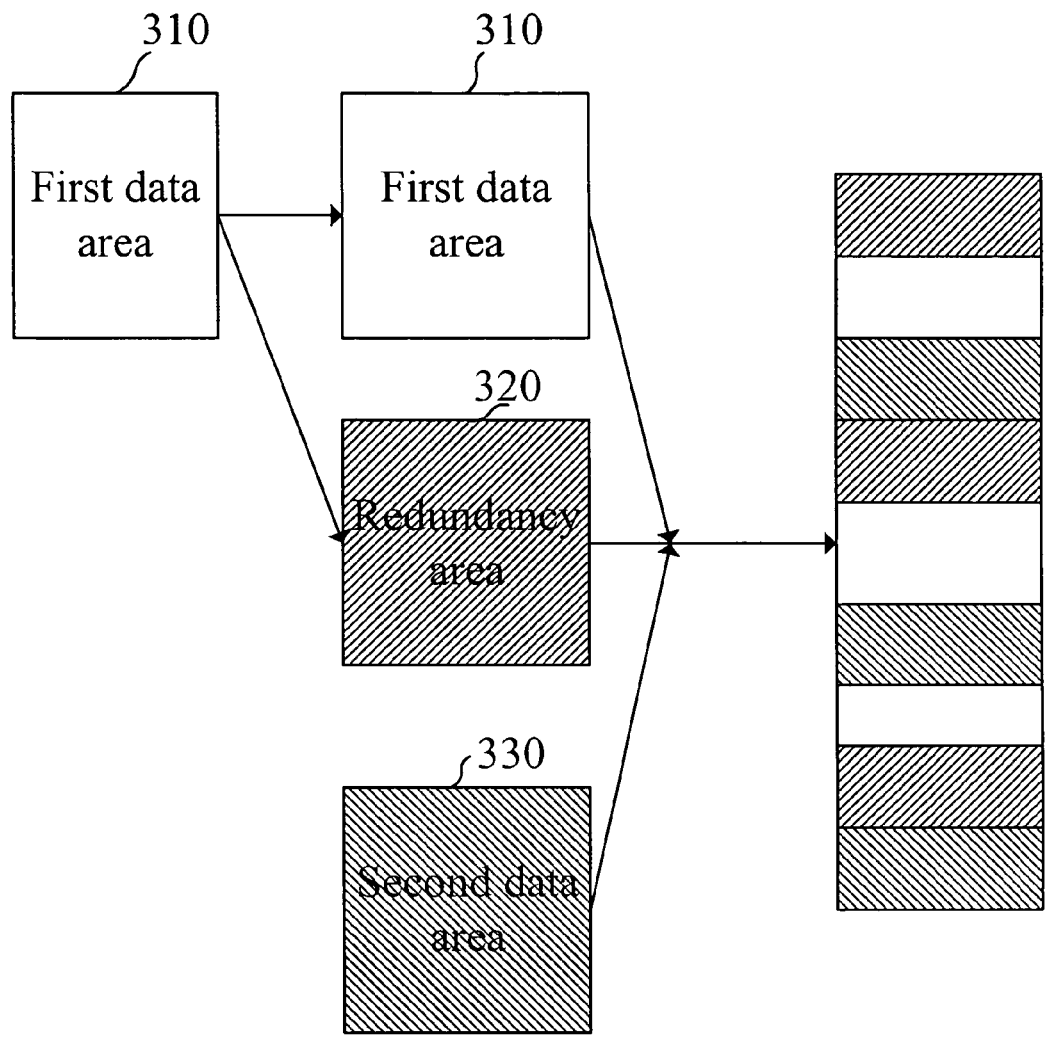
FIG. 4 is a schematic flow of storing data in first data area, redundancy area and second data area in accordance with the invention.

FIGS. 3 and 4 are schematic charts of operation examples of scrambling address lines for data protection. In FIG. 3, the content of the first data area is identical to that of the redundancy area. Accordingly, when the processor core 201 needs program codes or data in the first data area 310, the processor core 201 can read the required data or program codes from the first data area 310 or the redundancy area 320 in accordance with the switch control signal 261. Such a manner contributes uncertainty to address read by the processor core 201 due to different address provided in each execution for reading. Therefore, the program codes or data is dynamically protected by different addressing every time.

In FIG. 4, the first data area 310 is copied to the redundancy area 320. The first data area 310, the redundancy area 320 and the second data area 330 are scrambled to increase address randomness for store. The redundancy area 320 can increase address randomness during address scrambling performance and difficulty to an unauthorized person for crack. After address scramble, the processor core 201 does not sequentially execute the program codes anymore. However, when the program codes with the same function (e.g., Bootstrap) are executed by the processor core 201 each time, an address branch for reading instruction codes has the same rule. As such, address scrambling used can easily be decoded and understood by inversely inferring the rule. To avoid this, the redundancy area 320 is added to make different address branch to the same program codes for each execution. In this case, important program codes are located on the first data area 310 to increase execution randomness for data protection. This can prevent both static and dynamic decoding.

In view of foregoing, it is known that the invention applies the redundancy area 320 and a random generator 260 or the switch control signal 261 generated by the processor core 201 to increase access uncertainty to the first data area 310 and the redundancy area 320. In addition, the invention uses the address scrambler 290 to enhance address uncertainty in data access. Accordingly, the prior problem that scrambling method used can easily be found by guessing data disposition is overcome, thereby obtaining data protection.

Although the present invention has been explained in relation to its preferred embodiment, it is to be understood that many other possible modifications and variations can be made without departing from the spirit and scope of the invention as hereinafter claimed.

What is claimed is:

1. A device for data protection by scrambling address lines in a processor core, the processor core executing instructions of the processor and accessing data through an address bus and a data bus, the device comprising:
    a redundancy area-setting unit, which sets addresses of a first data area and addresses of a redundancy area of the memory corresponding to the first data area;
    a redundancy area-mapping rule unit, which provides rule for converting addresses of the first data area into addresses of the redundancy area;
    an area check unit, which is connected to the redundancy area-setting unit and the address bus for comparing an address on the address bus with addresses of the redundancy area stored in the redundancy area-setting unit and generating a comparison result;
    an address-mapping unit, which is connected to the redundancy area-mapping rule unit and the address bus for converting the address of the address bus into an address of the redundancy area; and
    a multiplexer, which is controlled by the comparison result and a switch control signal in order to output the address of the redundancy area when the comparison result is matched and the switch control signal is a special logic or otherwise output the address of the address bus.

2. The device as claimed in claim 1, wherein the special logic is logic true.

3. The device as claimed in claim 1, wherein the special logic is logic false.

4. The device as claimed in claim 1, wherein the redundancy area-setting unit further sets a second data area for storing remaining data not stored in the first data area, and an address of the second data area is output when the comparison result is unmatched.

5. The device as claimed in claim 1, wherein the switch control signal is generated by a random generator or the processor core.

6. The device as claimed in claim 1, further comprising:
    a seed generator, which randomly generates a seed; and
    an address scrambler, which is connected to an output of the multiplexer for address scrambling to output address of the multiplexer based on the seed.

7. The device as claimed in claim 6, wherein the address scrambler generates a scrambled address in accordance with entire or partial output addresses of the multiplexer.

8. The device as claimed in claim 7, wherein the address scrambler generates a scrambled address in accordance with (a-r) address lines on the address bus, where a is number of entire address lines and $2^r$ is word number of a cache line in a cache memory of the processor.

9. The device as claimed in claim 7, wherein the address line number on the address bus equals to the address line number after scrambling address.

10. The device as claimed in claim 7, wherein the address line number on the address bus is not equal to the address line number after scrambling address.

11. A method for data protection by scrambling address lines in a processor core, the processor core executing instructions of the processor and accessing data through an address bus and a data bus, entire or partial data accessed being stored in a first data area, the method comprising steps:
    (A) copying content of the first data area to a redundancy area;
    (B) recording both addresses of the first data area and the redundancy area;
    (C) providing rule for converting addresses of the first data area into addresses of the redundancy area;
    (D) comparing an address of the address bus with addresses of the first data area or the redundancy area and generating a comparison result when the processor core is to access data;
    (E) converting the address of the address bus into an address of the redundancy area in accordance with the algorithm; and
    (F) selecting an output address in accordance with the comparison result and a switch control signal, wherein the address of the redundancy area is outputted when the comparison result is matched and the switch control signal is a special logic and otherwise the address of the address bus is outputted.

12. The method as claimed in claim 11, wherein the special logic is logic true.

13. The method as claimed in claim 11, wherein the special logic is logic false.

14. The method as claimed in claim 11, further comprising steps:
    (G) randomly generating a seed; and
    (H) performing scrambling to the address output by step (F) based on the seed.

15. The method as claimed in claim 14, wherein step (H) generates a scrambled address in accordance with entire or partial address.

16. The method as claimed in claim 15, wherein step (H) generates a scrambled address in accordance with (a-r) address lines on the address bus, where a is number of entire address lines and $2^r$ is word number of a cache line in a cache memory of the processor.

17. The method as claimed in claim 15, wherein the address line number on the address bus equals to the address line number after scrambling address.

18. The method as claimed in claim 15, wherein the address line number on the address bus is greater than the address line number after scrambling address.

19. The method as claimed in claim 11, wherein when the processor core is to write data, the first data area and the redundancy area are accessed concurrently for data write.

* * * * *